INVENTOR.
LUCIEN-VICTOR GEWISS
BY
Lane, Aitken & Dunner
ATTORNEYS

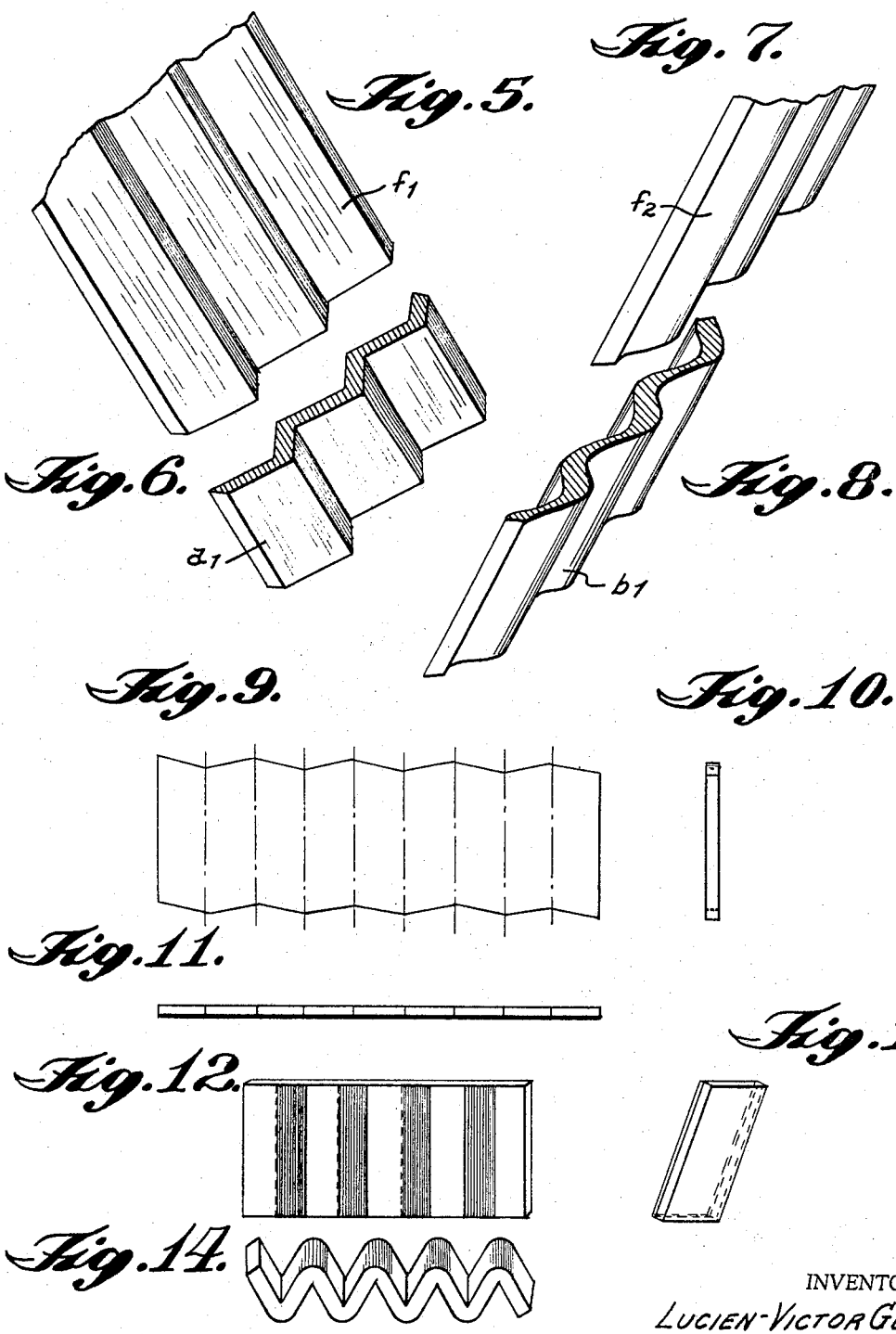

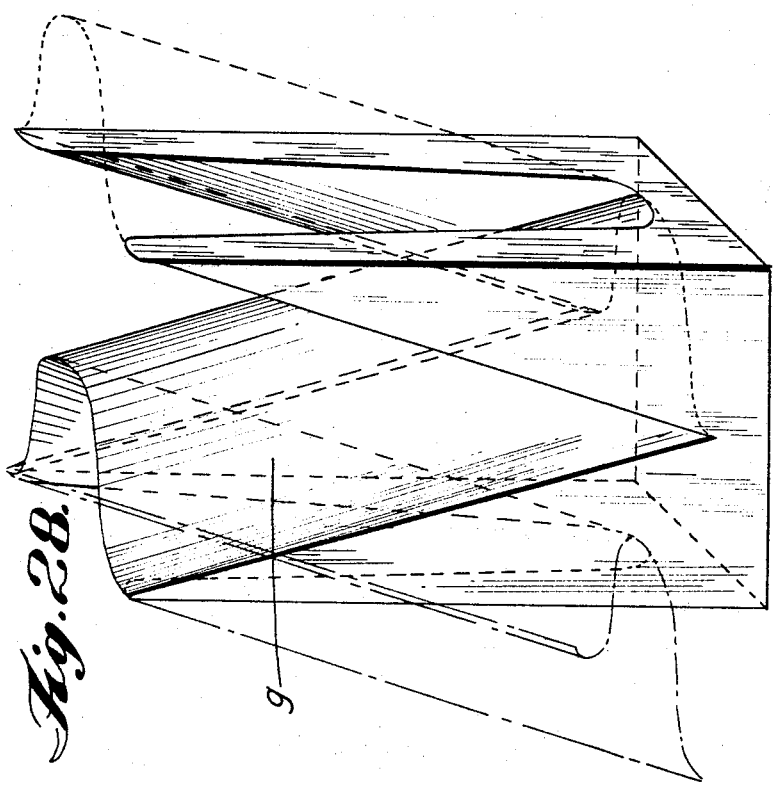
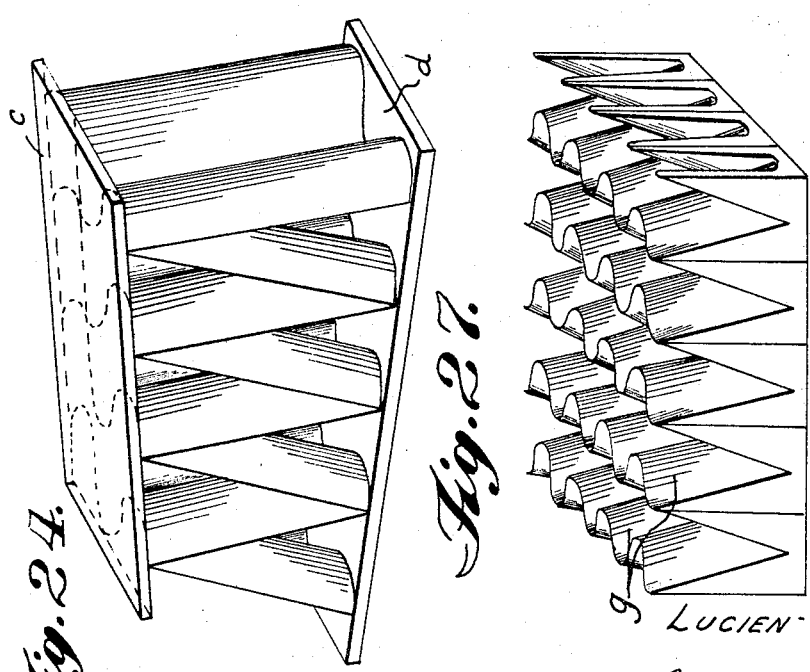

March 18, 1969     LUCIEN-VICTOR GEWISS     3,433,692
METHOD FOR FORMING HERRINGBONE CONFIGURATIONS
FOR SANDWICH STRUCTURES
Filed Aug. 8, 1962     Sheet 5 of 5
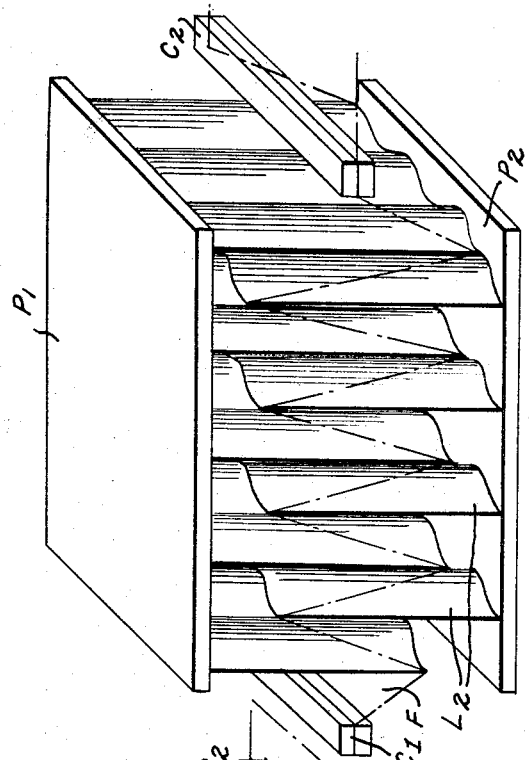
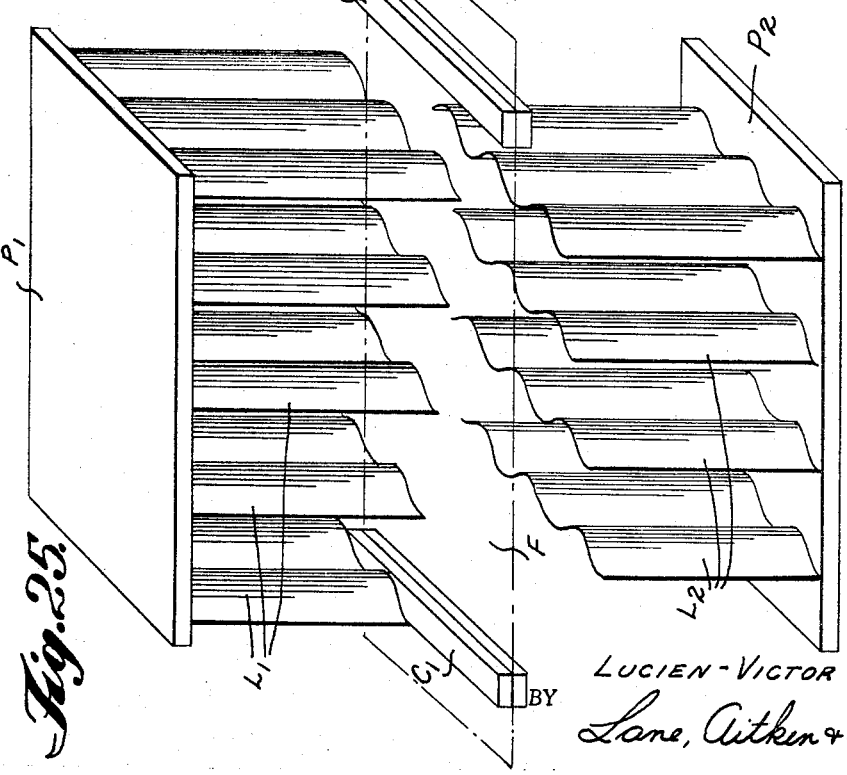
INVENTOR
LUCIEN-VICTOR GEWISS
BY
Lane, Aitken & Dunner
ATTORNEYS United States Patent Office 3,433,692
Patented Mar. 18, 1969

3,433,692
METHOD FOR FORMING HERRINGBONE CONFIGURATIONS FOR SANDWICH STRUCTURES
Lucien-Victor Gewiss, Ville-d'Avray, Hauts-de-Seine, France, assignor to Marc Wood Materials Societe Anonyme Pour la Promotion des Echanges Techniques Internationaux, Paris, France, a company of France
Filed Aug. 8, 1962, Ser. No. 215,591
Claims priority, application France, Aug. 9, 1961, 870,498
U.S. Cl. 156—197    22 Claims
Int. Cl. B31d 3/00; B32b 31/00, 3/12

The present invention relates to materials having a herringbone configuration on at least one of their faces and processes for their production.

In applicant's copending application Ser. No. 514,171, filed June 9, 1955 (which is hereby incorporated by reference herein and which is based upon French Patents 1,106,780 issued July 27, 1955; 66,807 issued Mar. 25, 1957; 67,078 issued May 13, 1957; and 68,479 issued Nov. 12, 1957; the latter three patents are patents of addition to French Patent 1,106,780) is described a novel type of material which is currently known under the name of "herringbone" structure and which, in its more general appearance, has the form of a structure folded from a flat sheet or band whose folds, located alternately in one and then another limiting plane, are zig-zag or corrugated lines. As pointed out in said copending application, such herringbone structures are comprised of ruled elementary surfaces which join each other along lines having points at which they change direction and at each of which points border lines of four of said elementary surfaces converge, the sum of the angles formed on said surfaces between said border lines at each of said points being equal to 360°. The surfaces of this novel structure may be planar or curved in configuration, or both, but in all cases the structure meets the limitations set forth above. As is set forth in said copending application, one of the peculiar characteristics of the herringbone structure is that its surface is in actuality the materialization of a more or less complex geometric configuration which is developable along a plane (although the structure itself is not necessarily effectively developable).

The advantages of such herringbone structures are many and varied. For example, the fact that the herringbone structure is geometrically developable in form makes it possible to form such structure solely by means of folding operations performed on flexible (through not necessarily extensible) materials at extremely low cost. And due to the almost complete lack of deformation of the material as a result of such folding operation, the material may be formed through a much greater angle than would be the case with conventional forming techniques without significant danger of rupture of the material. This advantage would alone make the novel herringbone structures of applicant's copending application extremely significant and advantageous in and of itself.

But in addition to such advantage, the very nature of the herringbone structure is such as to make it extremely desirable and advantageous even when flexible or pliable materials are not used as the starting materials. For example, the load resistance of such herringbone structures is much greater than that of conventional corrugated structures due to the presence of the ruled surfaces which actually act as beams in resisting deformation in response to an applied force. Any load exerted from one ridge line to the other is therefore supported by the material of the sides or flanks of the structure along straight resistance lines which necessarily connect the various points of one ridge line to the various corresponding points of the other ridge line in the plane opposite the first ridge. Under such circumstances, when a load is applied from one ridge line to the other, the sheets of herringbone material are compressed in the plane of their mean surface. The material therefore resists the load with the maximum resistance of which it is capable, i.e., the resistance in compression of the plane on itself.

Because of such desirable characteristics, the herringbone structures are extremely useful in a variety of applications, including sandwich structures, filters, heat exchangers, etc., the use of such material in filters and heat exchangers being particularly desirable, for example, due to the possession by such material of the optimum combination of strength and great surface area, not to mention the minimum expense at which the filters and heat exchangers may be fabricated.

Because of the great variety of applications of the herringbone structure, such structure may be fabricated by methods other than the bending or folding methods to which said copending application is primarily (though not exclusively) directed. Indeed, there are certain materials which are not adapted to be employed in the folding methods described in said copending application, but which are nevertheless useful in fabricating herringbone structures. For example, the following categories may be enumerated in terms of the types of materials which may be employed to fabricate herringbone structures in a manner other than the basic folding techniques described in applicant's copending application Ser. No. 514,171 (although it will be noted that some of these materials are also useable in the folding techniques of Ser. No. 514,171):

I. Pliable materials in the form of sheets whose elongation qualities, in the natural state or under the effect of a temporary suitable softening, are such that these materials can be made to assume certain herringbone forms either without previous preparation or following a first simple folding more or less accentuated and effected in rough form.

The sheet materials of this type are:

(1) Metals which can assume a herringbone form by hot or cold pressing in one or more passes between suitable dies.

(2) The majority of plastic materials, such as glass, certain ceramic materials, rubber, etc., which can undergo a temporary softening following a suitable effect such as heat, partial dissolution, humidification, etc. These different sheet materials thus softened can be put with advantage into herringbone form by simple pressing between suitable dies or even more simply by a breakdown between the folds of a herringbone form, under the effect of a depression or under the action of air or vapor pressure. The shaping method by blasting inside folds of a herringbone mold is a means which can be used to obtain closed structures (cylindrical, for example) or several opposing plane structures.

(3) Certain papers, felts, cardboards, fabrics, etc., after softening, which may be effected by humidification, for example. In this case, the production methods are of the same nature as the preceding ones. The insufficiency of the elongation qualities can be compensated for by rough-shaping, which permits the introduction of the material sheet into the mold, as in the preceding case, but with a larger surface.

II. Sheet materials which are made temporarily ductile by a suitable treatment which lend themselves in this state to great elongations in all directions without breaking.

Two different production methods, specially conceived to fashion from these materials herringbone structures destined more particularly for the manufacture of sandwich materials of different constitutions, will be described below.

III. Pliable or nonpliable materials having from the start the form of folded or corrugated sheets or plates The materials that can be found in this state are metals, a minority of plastic materials, the products derived from cement, cardboards, papers, composite materials, etc. These include, for example, corrugated sheets, corrugated cardboards, plates of materials commercially known as "Isorel," "Everite," plates of laminated wood, laminated plastic, etc.

Herringbone structures made from such preshaped materials are obtained by a method to be described below.

IV. Malleable materials of reduced thickness which do not appear in the form of sheets but in the form of narrow bands with regard to the height of the flanks of the herringbone structure to be produced These are practically all pliable sheet materials which are used for the manufacture of structures of large dimensions made, for example, of papers, felts, cardboards, thin metals, plastic materials, wire nettings, etc. In this case, it is generally not possible to use the classical herringbone methods because they require the use of sheets of exceptionally large width and the use of machines of large dimensions which are too expensive. Herringbone structures of this type will be described below in connection with a novel method of fabrication of such structures.

V. Materials of thick sheets or plate materials which are not pliable enough, due to their nature or because of their great thickness, to lend themselves to a herringbone pattern by folding, but which can nevertheless be cut into bands and be folded or fashioned in this form The sheet materials of this type are the following:
(1) Metals in the form of thick sheets.
(2) Most plastic materials.
(3) Composite materials, sandwich materials, corrugated cardboards, thick cardboards, laminated materials, wood, etc.

In this case, the practical impossibility of forming a herringbone structure with these materials by folding is due to their insufficient pliability, which is caused in metals and plastics by their great thickness and in composite products by their more or less undeformable texture. Herringbone structures of this type will be described below in connection with a novel method of fabrication of such structures.

VI. Materials whose production is necessarily or simply effected with advantage in other ways than by bringing them first into sheet form, because they lend themselves by nature or under the action of a suitable chemical or physical agent to assume the form of a mold Materials of this type are:
(1) Metals which by casting, stamping or swaging assume directly the herringbone form of a mold.
(2) Materials such as waxes, resins, etc., which are molded like the preceding ones.
(3) Plastic materials of any type which assume the most complicated forms by hot molding, under pressure or otherwise (injection, intrusion, etc.).
(4) Ceramic products of any type which assume, in the slip state, the form of molds inside of which they stay.
(5) Lime, plaster and cement, as well as products of any type which are mixed in granular form with a suitable binder, such as cement, glue, sodium silicate, plastic materials, etc., and which are susceptible of adhering to the inside of the mold after preparation.
(6) Products derived from latex which permit the obtaining of molded pieces of rubber ebonite after molding under pressure at the vulcanization temperature.
(7) Metals and powdered or granulated products which, when molded under pressure between suitable forms, can be solidified by heating at suitable temperatures.

While herringbone structures may, as above stated, be fabricated by the various methods set forth above, the instant application is particularly concerned with herringbone structures of the type set forth in Groups II, III, IV and V, and the particular methods involved in the fabrication of such herringbone structures. More specifically, the instant application is directed to structures all of which are formed by methods other than the types of folding operations set forth in copending application Ser. No. 514,171 but which possess, on at least one of their faces, a herringbone configuration as hereinbefore defined.

It is accordingly a primary object of the present invention to provide novel methods of fabricating herringbone structures and the structures formed thereby other than methods relying upon pure folding operations.

It is another primary object of the present invention to provide methods of forming herringbone structures and the structures produced thereby which are peculiarly adaptable to the use of sheet materials which are made temporarily ductile by treatment which adapts such materials to be substantially elongated in all directions without rupture.

It is still another object of the present invention to provide methods of fabricating herringbone structures and the structures produced thereby in which either pliable or nonpliable materials having an initial form of folded or corrugated sheets or plates are employed as starting materials and which does not involve folding of such starting materials.

It is a further object of the present invention to provide a novel method of forming herringbone structures and the structures produced thereby involving the use of malleable materials of reduced thickness which do not appear in the form of sheets but in the form of narrow bands with regard to the height of the flanks of the herringbone structure to be produced.

It is still a further object of the present invention to provide a novel method of forming herringbone structures and the materials formed thereby involving the use of materials of thick sheets or plates which are not pliable enough, due to their nature or their great thickness, to lend themselves to a herringbone pattern by folding techniques, but which can, nevertheless, be cut into bands and be folded or fashioned in such form.

It is still another object of the present invention to provide a novel block which, when combined with other like blocks, forms a herringbone pattern on at least one surface and which, together with said other blocks, is particularly adapted to form soundproof barriers.

These and other objects of the present invention will become more apparent upon reference to the ensuing description and appended claims and the attached drawings, wherein:

FIGS. 5 and 6 represent respectively, in a perspective view, a folded thick sheet and a flank formed from such a sheet.

FIGS. 7 and 8 represent respectively, in a perspective view, a thick corrugated sheet and a flank formed from this sheet.

FIGS. 9, 10 and 11 represent respectively elevation, profile and plan views of a band of thick material cut to a profile that permits the production of a folded flank.

FIGS. 12, 13, and 14 represent respectively an elevation, profile and plan view of the above mentioned band, which assumes after folding the form of a folded flank.

Figure 15:
Figure 16:
Figure 17:

FIGS. 15, 16 and 17 represent respectively an elevation, profile and plan view of a band of thin material cut to a profile that permits the production of corrugated flank.

Figure 18:
Figure 19:
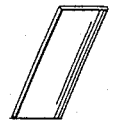
Figure 20:
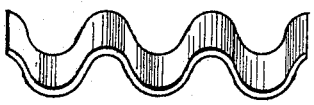

FIGS. 18, 19 and 20 represent respectively an elevation, profile and plan view of the above mentioned band, which assumes after corrugation the form of a corrugated flank.

Figure 21:
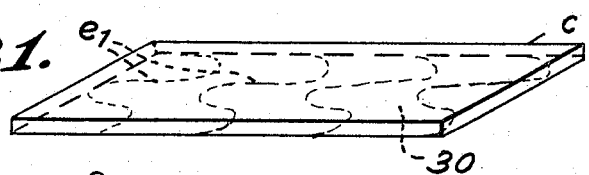
Figure 22:
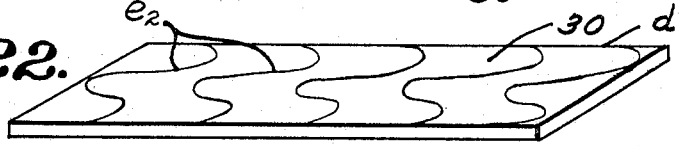

FIGS. 21 and 22 represent respectively perspective views of two plates prepared to receive between them a herringbone core according to a process provided by the present invention.

Figure 23:
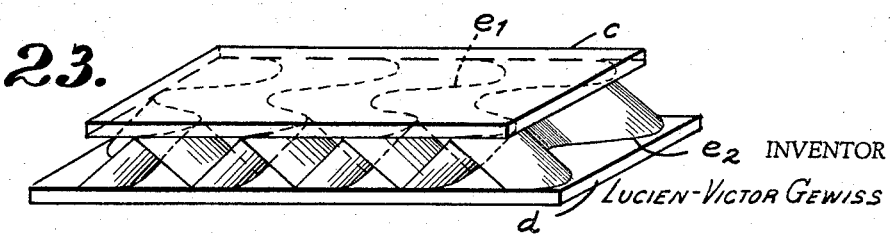

FIG. 23 represents in perspective view a sandwich material with a herringbone core and parallel faces constituted with the two above-mentioned plates.

FIG. 24 represents in perspective view a sandwich material with a herringbone core and nonparallel faces constituted with the two same plates.

FIGS 25 an 26 represent in perspective view two different operating positions of a special press designed to fashion herringbone structures from sheets of extensible material according to another process provided by the present invention.

FIG. 27 represents in perspective view a part of a soundproof wall of herringbone structure with corrugated flanks.

FIG. 28 represents in perspective view and on a larger scale one of the herringbone blocks entering into the constitution of the abve-mentioned soundproof wall.

FIGURES 1–4 represent structures which may be fabricated by the techniques of FIGURES 5–20.

Figure 1:
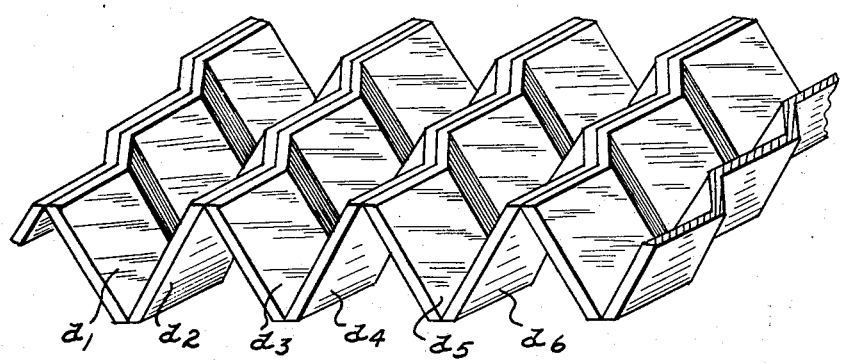
FIG. 1 represents in a perspective view a herringbone material constituted by equal or symmetrical broken flanks, assembled together.

In the structure of FIG. 1, the material under consideration is constituted by thick broken flanks $a_1, a_2, a_3, a_4$, etc., which are respectively truncated elements of the same height and parallelism of a developable herringbone configuration with equal and symetrical alternately broken flanks, these truncated elements being assembled together along their contact lines by soldering, gluing or other conventional means.

Figure 2:
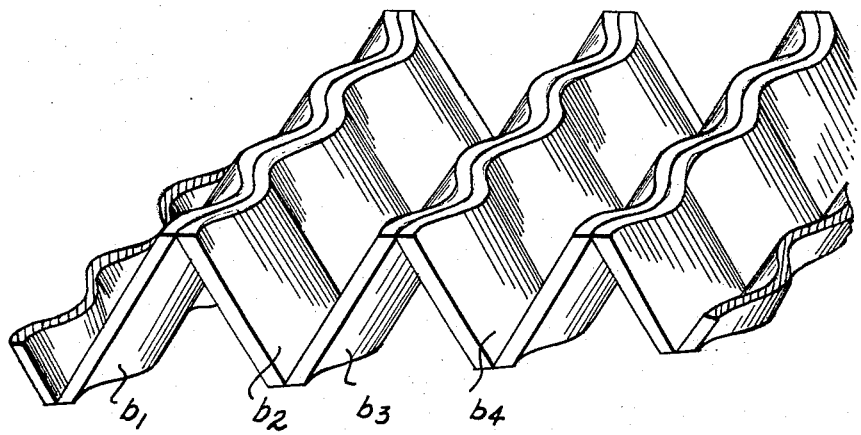
FIG. 2 represents in a perspective view a herringbone material consisting of corrugated flanks of progressively increasing height and assembled together.

In the variant represented in FIG. 2, the herringbone material consists of thick corrugated flanks $b_1, b_2, b_3, b_4$, etc., which are respectively truncated elements of progressively increasing height of a herringbone configuration with equal and symmetrical corrugated or sinuous flanks. As before, these truncated elements are assembled together along their contact lines by soldering, gluing or the like.

Naturally, it is possible to obtain a material of the type represented in FIG. 1 by assembling truncated elements with broken flanks of progesssively increasing height like the element with corrugated flanks of the material represented in FIG. 2. Inversely, it is possible to obtain a material of the type represented in FIG. 2 by assembling truncated elements with corrugated or sinuous flanks having the same height.

Figure 3:
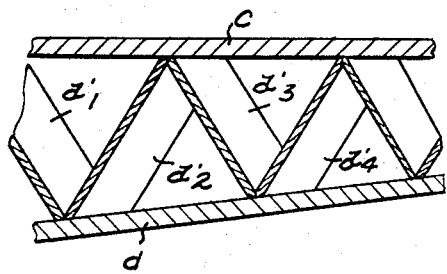
FIGS. 3 and 4 represent in section two "sandwich" plates with a herringbone core, the first with joined separate flanks, the second with unjoined separate flanks.

FIG. 3 represents a sandwich panel whose core material is of the same type as represented in FIG. 1, with broken flanks $a'_1, a'_2, a'_3, a'_4$, etc. interposed between two plates $c$ and $d$. These flanks are here constituted by sections of a herringbone structure having progressively increasing heights, which are assembled together side by side by soldering, gluing, hard soldering, etc., depending on the material of which they are made. In a similar manner, the sandwich panels can comprise a core formed either of broken flanks of the same height or of corrugated flanks of the type of FIG. 2, constituted by truncated elements of the same progressively increasing height.

Figure 4:
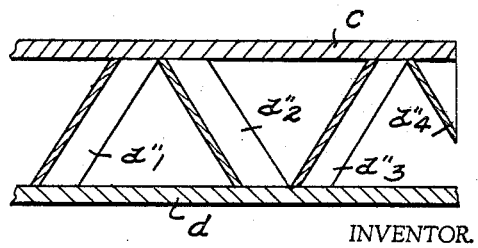

In the variant represented in FIG. 4, the sandwich panel comprises two plates $c$ and $d$ between which are interposed the elements $a''_1, a''_2, a''_3, a''_4$, etc., all of the same height, truncated between parallel sections. These elements are fixed in place like those of the preceding panel, but not jointly, thus forming a herringbone structure with broken flanks.

The particular method of preparation of the flanks which are used to form the structures of FIGS. 1–4 depends upon the nature of the material to be used in their fabrication. When the material to be used is available in the form of folded corrugated sheets having as a cross section the cross section of the flanks to be provided (viz., Group III, previously enumerated), the flanks may be prepared accordingly to the present invention by cutting off flank sections from the corrugated sheet at a suitable height and at a suitable angle with respect to the length of the sheet.

Such a technique is illustrated in FIGS. 5–8, FIGS 5 and 6 illustrating a folded sheet having planar segments and FIGS 7 and 8 illustrating a corrugated sheet with a sinuous cross section. As will be apparent from FIGS. 5 and 6, for example, a section $a_l$ is cut off the folded sheet $f_1$ at such a point that the height of section $a_1$ will correspond to the height of flank desired in the final product, i.e., correspoding to the height of section $a_1$ in the herringbone structure of FIG. 1. (As will be apparent, the section $b_1$ in FIG. 8 represents the corresponding sinuous flank $b_1$ in the herringbone structure of FIG. 2.) When a plurality of such flanks have been cut, they are then arranged together in the manner shown, for example, in FIGS. 1–4 and fixed in place by a conventional bonding operation.

The important and critical aspect of the method just described in connection with FIGS 5–8 is that each flank section cut off the elongated folded or corrugated sheet must be cut off at an angle to a plane parallel to the sheet, i.e., at an angle to a plane passing through the ridge lines of said sheet, while the sheet is in its folded or corrugated condition. If the cutting angle is normal to the plane of the sheet or if the sheet is cut while in planar form (i.e., before corrugating or folding), the flanks cut from the sheet will not mate with one another when placed in angular relationship as in FIGS 1 and 2.

The cutting technique will vary, of course, depending upon the material being cut, a high speed abrasive cutting wheel being an example of a means which may be employed for cutting materials such as were described in Group III, supra.

When the material to be used is one of those described previously in Groups IV and V, i.e., where (1) the material, though malleable, is not available in the form of elongated sheets but only in the form of bands whose height (or length) is not sufficient to permit it to be folded into a full herringbone structure, or (2) where the material is in the form of thick sheets or plates which are not pliable enough, due either to their very nature or because of their great thickness, to be folded into a complete herringbone pattern but which, nevertheless, can be put into narrow bands and be folded or fashioned in that form, the method illustrated in FIGS. 9–20 may be employed to form the herringbone structure.

In accordance with this method (for this description, the folded species of FIGS. 9–14 will be referred to; obviously, the same considerations apply to the corrugated or sinuous species of FIGS. 15–20), the flat (unfolded) material is first cut into a form corresponding to the form which one flank of the completed herringbone structure would have if flattened (viz., developed) completely, as shown in FIGS. 9–11. This flat flank is then folded along the broken lines shown in FIG. 9 (in the species of FIGS. 15–20, a continuous sine-wave bend, rather than a plurality of single folds, will be formed) to form the completed flanks of FIGS. 12–14. A plurality of such flanks are then bonded into a unitary structure as previously descirbed in connection with FIGS. 1–4.

FIGS. 23 and 24 represent two "sandwich" panels, one with parallel faces and the other with nonparallel faces, which are obtained in a particularly economical manner by a new and simple process which accentuates the remarkable properties of the herringbone configuration. In this particular case, which corresponds to the situation previously descirbed in connection with Group II., each of the two plates $c$ and $d$ of the future sandwich panel (represented separately in FIGS. 21 and 22) is covered on its inside face with an antiadhesive material 30 such as oil, powders of various types, a silicon coating, etc. The antiadhesive coating is uniformly spread over the entire surface of said inside faces, with the exception of the lines or bands $e_1$ and $e_2$ which correspond to the lines or zones at which ridges of the herringbone core of the future panel respectively abut plates $c$ and $d$. Bands $e_1$ and $e_2$, which are free of the antiadhesive material, may clearly be seen in FIGS. 21–23. These bands are sinuous lines in the represented example, but they may also be other than sinuous, i.e., linear broken lines, etc.

After the plates $c$ and $d$ have thus been prepared by applying the antiadhesive coating to their inner surfaces and applying a suitable adhesive to bands $e_1$ and $e_2$, the plates are brought together by positioning them correctly with regard to one another, i.e., so that the bands $e_1$ are located between (preferably midway between) the bands $e_2$, and placing between them a sheet material of suitable thickness and nature. The material of the sheet which is used must lend itself temporarily under suitable chemical or physical effects to adhering to the unprotected bands $e_1$ and $e_2$ of the plates $c$ and $d$ while being freely elongatable between the plates when the plates are progressively moved away from each other. When the effects which have permitted the adhesion of the sheet material to bands $e_1$ and $e_2$ and particularly the elongation of the sheet have terminated, the sheet material must assume the necessary resistance to crushing of a firm panel.

The core material most advantageously useable in this process is any one of a number of thermoplastic materials which will become elongatable upon the application of a sufficient quantity of heat. For example, an appropriate sheet of thermoplastic material may be placed between plates $c$ and $d$ whose bands $e_1$ and $e_2$ have been coated with a suitable adhesive and the entire assembly heated approximately to the melting point of the thermoplastic heat. The temperature is then permitted to drop several degrees back to a proper softening level and, when plates $c$ and $d$ are moved apart from one another, the thermoplastic sheet will elongate in those areas not in contact with the adhesive-coated bands $e_1$ and $e_2$ to form a sandwich structure having a core of developable herringbone configuration such as shown in FIGS. 23 and 24.

The optimum temperature for operation will necessarily vary, depending upon the type of thermoplastic sheet which is used as the core material. Following are a number of themoplastic materials which may be employed in the instant process, alongside which are listed their average softening temperatures:

| | Degrees F. |
|---|---|
| Vinyl | 320 |
| Polyvinyl chloride | 280 (212–300) |
| Styrene copolymers | 315 |
| Cellulose acetate | 315 |
| Cellulose acetate butyrate | 320 |
| Polymethyl methacrylate | 176±25 |
| Polyethylene | 350 |
| Polypropylene | 300 |
| Nylon or rilsan | about 650 |
| Polythene | 215 |

The material used as the sandwich plates (such as plates $c$ and $d$) should, of course, preferably be of a material which will not itself soften at the temperature employed to soften the core sheet material and must also be properly selected so that the core sheet material will adhere to the adhesive coating on bands $e_1$ and $e_2$ of plates $c$ and $d$. Such adhesion may be effected, as indicated above, with a standard adhesive such as conventional epoxy resin, or other conventional adhesion techniques may be employed.

In order to get an even temperature all along the sheet of thermoplastic material, it is desirable to make use of heaters located on both sides of plates $c$ and $d$ (viz., over and under plates $c$ and $d$) having a properly chosen heating density and to apply the heat for the correct period of time. For example, for polypropylene, the density of heat should be about 6.6 kw./ft.$^2$ of sheet and the temperature of the heaters under the sheet should be approximately 1,025° F. and over the sheet 1,100° F. The time required to heat the thermoplastic sheet to its forming point will be approximately 0.32 second per 0.001 inch of sheet thickness. These figures are appropriate for a sheet approximately 0.125" thick and should be altered appropriately for other thicknesses.

One technique of practising the invention of FIGS. 21–24 is to effect the operations described above by placing plates $c$ and $d$ (after they have been properly prepared as described above) between the two plates of a double-action press whose supporting surface is provided with vents. By compressing the plates $c$ and $d$ and the interposed sheet material at a suitable temperature between the plates of the press, the adhesion of the plates $c$ and $d$ to the sheet material is effected along the bands $e_1$ and $e_2$. By moving the two plates $c$ and $d$ progressively apart to the desired thickness, made possible by the vents provided on the plates, the interposed core material, suitable softened (by heat, for example) will extend from bands $e_1$ to bands $e_2$ and assume a herringbone form. The sandwich panel thus obtained may then be removed from the press and the material of the herringbone core be given sufficient time to assume its original resistance in order to obtain the finished sandwich panel.

While the foregoing process has been described in terms of a core material which can be made extensible through the application of heat, other core materials, such as those which can be made extensible through chemical treatment, may also be utilized effectively.

Another method for fabricating herringbone structures in accordance with the situation previously described in Group II of the present invention is set forth below with reference to FIGS. 25 and 26. In accordance with this process, the two plates $P_1$ and $P_2$ are provided respectively with opposed elongated and thin blades $L_1$ and $L_2$ which have in the represented example a sinuous profile but which may also have a profile formed of linear broken lines, depending upon the type of herringbone structure to be fabricated. Plates $P_1$ and $P_2$ are movably mounted with respect to one another on opposed movable jaws of a suitable machine so that their respective blades $L_1$ and $L_2$ are movable into interleaving relation (see FIG. 26).

In the practice of this method, the jaws of the machine are separated until the free ends of the blades $L_1$ and $L_2$ are free from each other, as can be seen in FIG. 25. Approximately midway between such free ends is then placed a sheet of material F (represented by broken lines in FIGS. 25 and 26) which is maintained in planar position by means of a pair of clamp supports $C_1$ and $C_2$. Sheet F is made of a material such as the thermoplastic sheets used in the embodiment of FIGS. 21–24 and which has been made temporarily extensible by means of a chemical or physical agent, such as heat.

By closing the jaws of the machine progressively on the softened sheet F, the engaging free ends of the blades $L_1$ and $L_2$ make contact with the material and elongate it between themselves as they move toward one another. When the opposing blades have reached the limit of their movement toward one another, the resulting sheet F will have assumed a herringbone configuration such as that of the core of the embodiment of FIGS. 21–24. When the desired form has been obtained, a sufficient period of time is permitted to elapse to permit the material to harden and a new shape of sheet F to set in. The newly formed herringbone structure may then be removed by moving the jaws of the machine apart.

The process of FIGS. 25 and 26 is universal, since it permits any type of structure to be fabricated regardless of how complicated its form and how irregular its thickness, the only reservation being that the shaping blades must be interleavable in the closed position of the press. It is also possible, at the expense of additional complications in production equipment, to make additional forming blades act subsequently on the material or to complete the folds on a second machine if it was not possible to do so on the first machine. Naturally, the ridge lines of the resulting herringbone structure can be thickened or given greater breadth, by increasing the thickness of the blades $L_1$ and $L_2$.

The herringbone structures of the present invention are also of extreme utility in connection with the fabrication of acoustical blocks, as shown more particularly in FIGS. 27 and 28. FIG. 27 depicts a soundproof wall or partition formed of a plurality of the herringbone blocks shown individually in FIG. 28. As will readily be seen in FIG. 28 (particularly with the aid of the phantom lines which are set forth), one of the surfaces of each such block has formed therein a portion of a sinuous herringbone configuration (viz., of the type shown in FIG. 2) in such a manner that when a plurality of such blocks are placed side by side as in FIG. 27, a full sinuous herringbone development is formed meeting the definition of such herringbone structures described earlier in this specification.

Such herringbone blocks make possible the fabrication of soundproof walls and the like which are greatly improved over conventional soundproof walls. No doubt the greatest advantage of walls formed from the blocks of FIG. 28 is that they effect an extremely fine diffusion of sound waves since they offer to the sound only surfaces that do not permit any concentration of sound waves by reflection. Conventional blocks constituted of flat surfaces, for example, reflect sound waves in bunches and in a small number of preferential directions. In addition, the herringbone blocks of FIG. 28 can readily be formed through a simple molding process involving the use of soundproof material such as cellular plastics or supple agglomerated products.

When used in the claims, the term "herringbone structure" shall be construed to refer to a structure comprised of ruled elementary surfaces which join each other along lines having points at which they change direction and at each of which points borderlines of four of said elementary surfaces converge, the sum of the angles formed on said surfaces between said borderlines at each of said points being equal to 360°.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embranced therein.

What is claimed:

1. A method of forming sandwich structures constituted by a plurality of spaced skins connected by a central cellular core, said core abutting and being bonded to each of said skins at a plurality of spaced points, comprising: rendering the abutting surfaces of a continuous sheet of core material and a pair of skins adhesive relative to one another solely at said plurality of said spaced points; sandwiching said skins about and in contact with said sheet of core material so that the plane of the latter is parallel to the plane of said skins and so that said skins contact said core both at said spaced points and at points therebetween, said core material being extensible under a first condition and rigid under a second condition; adhering each of said skins to the side of said sheet with which it is in contact solely at said plurality of said spaced points by means of the relatively adhesive property of said abutting surfaces; moving said skins apart into a predetermined spaced relationship while said core material is under said first of said conditions; and rigidifying said core material while said skins are in said spaced relationship by subjecting said core material to said second condition.

2. A method as defined in claim 1 wherein said core is formed of a thermoplastic material, said first condition being brought about by the application to said core of sufficient heat to render it extensible, and said second condition being brought about by cooling said core to a point at which it is rigid.

3. A method as defined in claim 1 wherein said skins are adhered to said sheet of core material by providing adhesive to the side of said skins which is to be in contact with said core solely at said spaced points.

4. A method as defined in claim 1 wherein said skins are adhered to said sheet of core material solely at said plurality of spaced points by applying an anti-adhesive material to the core side of said skins except at said plurality of spaced points.

5. A method as defined in claim 1 wherein the central cellular core of said finished sandwiched structure is a herringbone structure comprised of ruled elementary surfaces which join each other along lines having points at which they change directions and at each of which points borderlines of four elementary surfaces converge, the sum of the angles formed on said surfaces between said borderlines at each of said points being equal to 360° and wherein said plurality of spaced points constitute the point of abutment of said skins with the ridges of said herringbone structure.

6. A method of forming corrugated material comprising positioning a first set of blades having free edges and a second set of blades having free edges in opposition to one another and on either side of a sheet of material which is extensible under a first condition and which may be set to a relatively non-extensible condition under a second condition; moving said first and second sets of blades into contact with said sheet of material and into interleaving relationship with one another with said sheet under said first condition, until said sheet is extended to the desired corrugated form; and subjecting said extended sheet to said second condition to set said sheet in such form.

7. A method as defined in claim 6 wherein the free edges of the blades in each of said first and second blade sets have the same configuration as that of the ridges which are desired to be formed in the finished corrugated material.

8. A method as defined in claim 7 wherein said sheet is held taut between said first and second sets of blades during said extending operation.

9. A method as defined in claim 8 wherein said sheet is a thermoplastic material which is made extensible through the application of heat.

10. A method as defined in claim 7 wherein the desired corrugated material is of herringbone configuration comprised of ruled elementary surfaces which join each other along lines having points at which they change direction and at each of which points borderlines of four of said elementary surfaces converge, the sum of the angles formed on said surfaces between said borderlines at each of said points being equal to 360°, each of the free edges of the blades in each of said first and second blade sets having a zig-zag cross section conforming to one ridge line of the herringbone structure.

11. A method as defined in claim 10 wherein the cross section of said free edges is sinuous.

12. A method as defined in claim 7 wherein the blades of said first set of blades alternate with the blades of said second set of blades when said two-blade sets are interleaved.

13. A method of forming a herringbone structure comprising subjecting a longitudinally corrugated member having a cross section in a plane normal to its longitudinal axis corresponding to the desired cross-section of the flanks of said herringbone structure; to a cutting operation to cut as many flank segments off said longitudinally corrugated member as are necessary to form said herringbone structure, the cutting plane used to form said flank segments passing through said corrugated member transversely of the longitudinal corrugations thereof and at an angle to said longitudinal axis, the length of each flank segment in the direction of said longitudinal axis corresponding to the length of the flank as it appears in the finished herringbone structure; mounting said cut flank segments in a unitary structure in such a manner as to present a plurality of undulations in the direction of the corrugations on said flanks, each of said undulations being formed of two flank segments in substantially V-shaped relation to one another and with their cut edges in substantial parallelism, the corrugations of one of said two flank segments being reversed with respect to the corrugations of the other of said two flank segments.

14. A method as defined in claim 13 wherein said corrugations are sinuous in cross-section.

15. A method as defined in claim 13 wherein the walls of the corrugated member are planar.

16. A method as defined in claim 13 wherein the cut edges of successive flank segments are bonded to one another.

17. A method as defined in claim 13 wherein the cut edges of successive flank segments are spaced from one another and are connected into a unitary structure by forming them as the core of a sandwich structure, the cut edges of said flank segments being connected by means of the skins of said sandwich structure.

18. A method of forming a herringbone structure, said herringbone structure having a plurality of undulations in a first direction, each undulation being formed by two flank segments which are themselves undulated in a second direction substantially normal to said first direction, the undulations of each flank segment in said second direction being reversed with respect to the corresponding undulations of its next adjacent flank segment in said first direction, comprising: modifying the shape of individual flank segments the outline of which corresponds to a flank segment of the finished herringbone structure but in developed form to form undulations in each flank segment in a direction corresponding to said second direction in the finished herringbone structure so that each such flank segment is in the form it will have in said finished herringbone structure; and mounting said undulated flank sections in a unitary structure in such a manner as to form said undulations in said first direction with the undulations of each flank segment in said second direction being reversed with respect to the corresponding undulations of its next adjacent flank segment in said first direction.

19. A method as defined in claim 18 wherein said undulations in said second direction are sinuous in cross section.

20. A method as defined in claim 18 wherein the sides of said undulated flank segments are planar.

21. A method as defined in claim 18 wherein the edges of successive flank segments in said second direction are bonded to one another.

22. A method as defined in claim 18 wherein the edges of successive flank segments in said second direction are spaced from one another and are connected into a unitary structure by forming them as the core of a sandwich structure, said edges of said flank segments being connected by means of the skins of said sandwich structure.

References Cited
UNITED STATES PATENTS

| | | | |
|---|---|---|---|
| 2,670,314 | 2/1954 | Ungar | 156—197 |
| 3,082,142 | 3/1963 | Payne et al. | 156—197 |
| 2,633,439 | 3/1953 | Konstandt | 161—69 |
| 2,644,777 | 7/1953 | Havens | 161—69 |
| 2,896,692 | 7/1959 | Villoresi | 156—596 XR |
| 2,963,128 | 12/1960 | Rapp | 161—134 XR |
| 2,814,332 | 11/1957 | Molla | 156—470 XR |
| 2,862,624 | 12/1958 | Stokes | 210—493 |
| 2,901,951 | 9/1959 | Hochfeld | 156—594 XR |
| 2,950,656 | 8/1960 | Gewiss | 93—1 |
| 1,993,172 | 3/1935 | Kent | 156—210 |
| 1,619,081 | 3/1927 | McLaurin | 156—289 XR |
| 2,962,409 | 11/1960 | Ludlow et al. | 156—229 XR |
| 3,300,359 | 1/1967 | Nikkel | 156—470 XR |

EARL M. BERGERT, *Primary Examiner.*

H. F. EPSTEIN, *Assistant Examiner.*

U.S. Cl. X.R.

156—229, 250